(12) United States Patent
Finlay

(10) Patent No.: US 6,349,245 B1
(45) Date of Patent: Feb. 19, 2002

(54) METHOD OF AND APPARATUS FOR REGISTRATION OF A ROBOT

(75) Inventor: Patrick Armstrong Finlay, Beaconsfield (GB)

(73) Assignee: Armstrong Healthcare Limited, Bucks (GB)

( * ) Notice: Subject to any disclaimer, the term of this patent is extended or adjusted under 35 U.S.C. 154(b) by 0 days.

(21) Appl. No.: 09/622,528

(22) PCT Filed: Feb. 11, 1999

(86) PCT No.: PCT/GB99/00433

§ 371 Date: Sep. 18, 2000

§ 102(e) Date: Sep. 18, 2000

(87) PCT Pub. No.: WO99/42257

PCT Pub. Date: Aug. 26, 1999

(30) Foreign Application Priority Data

Feb. 18, 1998 (GB) .............................. 9803364

(51) Int. Cl.[7] .............................. G06F 19/00
(52) U.S. Cl. .................. 700/245; 700/213; 700/254; 318/568; 318/568.13; 382/152; 382/154; 901/2; 901/16
(58) Field of Search .............. 700/254, 245, 700/213; 318/568.13, 568.15; 382/154, 136, 190, 302; 725/131, 116, 86; 356/610, 352, 512, 520, 603; 901/47, 9

(56) References Cited

U.S. PATENT DOCUMENTS

| | | | | |
|---|---|---|---|---|
| 3,576,997 A | * | 5/1971 | Slavin ........................ | 250/90 |
| 4,459,526 A | * | 7/1984 | Griebeler ................... | 318/576 |
| 4,707,647 A | * | 11/1987 | Coldren et al. ............. | 318/568 |
| 4,725,965 A | | 2/1988 | Keenan | |
| 4,731,860 A | * | 3/1988 | Wahl .......................... | 382/281 |
| 4,831,549 A | * | 5/1989 | Red et al. ................... | 700/254 |
| 4,843,561 A | * | 6/1989 | Larson ....................... | 700/213 |
| 4,985,846 A | | 1/1991 | Fallon | |
| 5,083,073 A | | 1/1992 | Kato | |
| 5,297,238 A | | 3/1994 | Wang | |
| 5,446,835 A | | 8/1995 | Iida | |
| 5,467,517 A | * | 11/1995 | Sugito et al. ............. | 29/407.05 |
| 5,523,663 A | | 6/1996 | Tsuge | |
| 5,552,575 A | * | 9/1996 | Doumanidis ........... | 219/124.34 |
| 5,680,694 A | * | 10/1997 | Best ............................ | 29/701 |
| 5,903,663 A | * | 5/1999 | Abend ....................... | 382/152 |
| 5,968,297 A | * | 10/1999 | Looker et al. ............ | 156/64 |

FOREIGN PATENT DOCUMENTS

| | | |
|---|---|---|
| EP | 0 152 594 | 8/1985 |
| FR | 2 669 257 | 5/1992 |

OTHER PUBLICATIONS

Navab et al., Visual servoing for automatic and uncalibrated needle placement for percutaneous procedures, 2000, IEEE, pp. 327–334.*

* cited by examiner

Primary Examiner—William A. Cuchlinski, Jr.
Assistant Examiner—McDieunel Marc
(74) Attorney, Agent, or Firm—Harrison & Egbert

(57) ABSTRACT

In order to register a robot, the operative parts of the robot are placed in a first condition. An image acquiring arrangement carried by the robot is directed towards an item, and the image of that item is acquired and stored. Subsequently the component parts of the robot are moved so that the image acquiring arrangement can acquire a second different image of the item. The process is repeated to acquire data including a plurality of images and, for each image, data concerning the position of the component parts of the robot when the image was acquired.

5 Claims, 2 Drawing Sheets

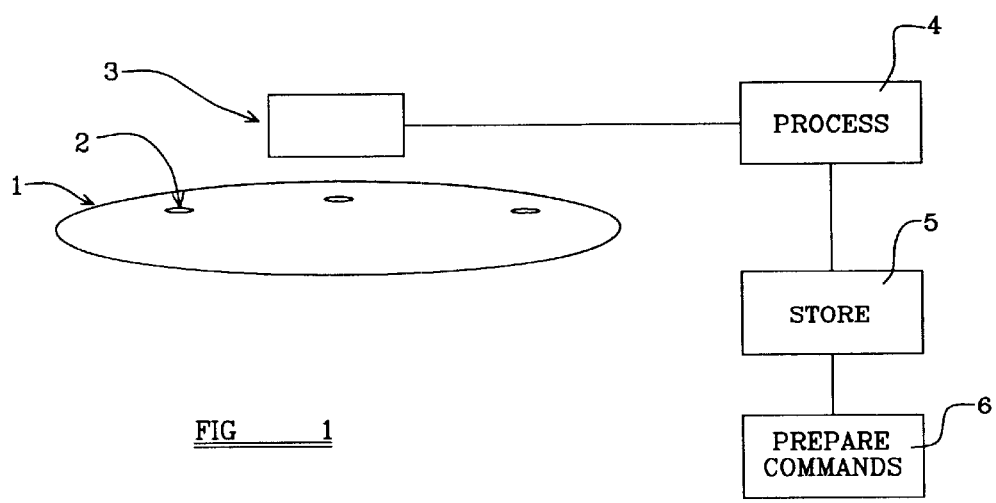
FIG 1
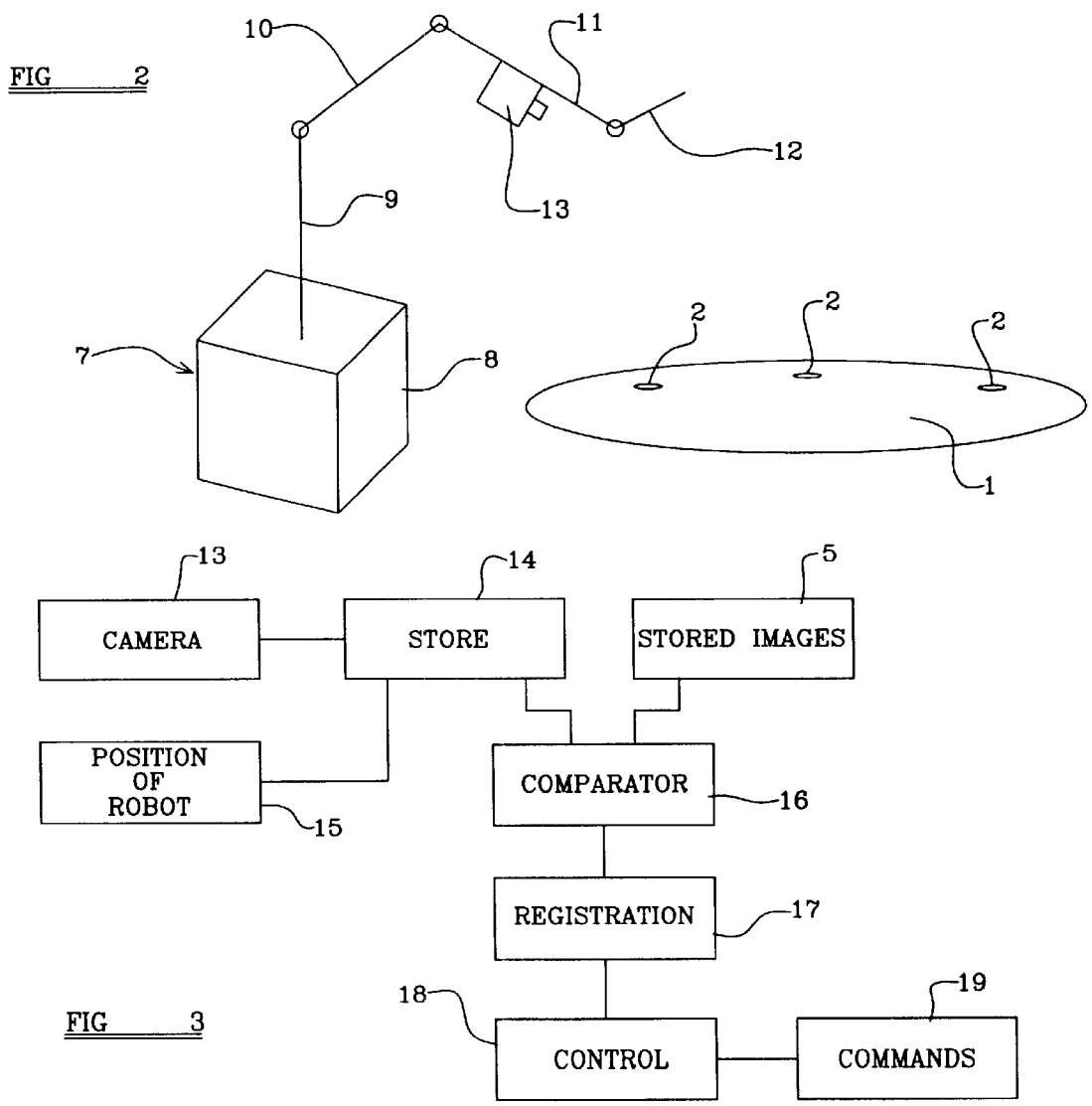
FIG 2
FIG 3

METHOD OF AND APPARATUS FOR REGISTRATION OF A ROBOT

BACKGROUND OF THE INVENTION

1. Field of the Invention

The present invention relates to a method of and an apparatus for registering a robot.

In particular, in one aspect, the invention relates to an apparatus for and a method for the registration of a robot to a work piece, to enable the robot, or part of the robot, to be placed in a precisely predetermined position relative to the work piece, thus enabling the robot to operate accurately on the work piece, and to perform desired operations at precisely predetermined points on the work piece.

In an alternative aspect, the invention relates to a method of and an apparatus for registering a robot in which the precise position and orientation of a tool carried by part of the robot is determined relative to that part of the robot, to enable the robot subsequently to position the tool, or part of the tool, in a predetermined position.

2. Description of Related Art

In many situations where robots are used, the robot is programmed to operate on a work piece of a precisely known size and shape. An example of such a situation is where a robot operates on a motor vehicle assembly line, where each work piece, in other words each vehicle that the robot has to operate upon, is of a precisely known size and shape. In such a situation the robot can be pre-programmed to carry out a sequence of moves which are appropriate for the task that the robot has to perform.

There are, however, various situations where a robot has to perform tasks on a work piece where the size and shape and other characteristics of the work piece are known approximately, but the precise details differ from specimen to specimen. Examples include hand-made items, items made of semi-rigid or deformable material and, in particular, living tissue, for example in a situation where the robot is used in an operating room. In such a situation, it it not uncommon for the task of the robot to involve the steps of penetrating the "work piece" in order to access a particular internal target or pathway. Typically, the internal target or pathway is invisible from the surface of the work piece, and, especially in the situation of a robot acting on a human patient in an operating room, it is essential that the robot access the internal target or pathway accurately.

A convenient method which has been used for specifying appropriate coordinates and instructions to the robot for these types of tasks involves the use of an image guided technique. In utilizing this technique, an image is acquired of the work piece, for example by using x-rays, magnetic resonance imaging, ultra-sound imaging or some other corresponding technique. The imaging technique that is utilized is chosen so that the internal target or pathway is revealed or can be determined.

The image is computer-processed and displayed in a form that is convenient for a human operator. Depending upon the preference of the operator, and the nature of the internal target or pathway, the display may be presented as a series of "slices" through the work piece, or as three orthogonal views through a designated point, or alternatively as a three-dimensional reconstruction. There are many types of image processing algorithms available for this purpose.

Using a pointing device, such as a mouse, the human operator can now specify on the computer representation of the work piece where the target or pathway is located. The operator may also indicate the required approach path for the robot to reach the target or pathway, from the surface of the work piece. The coordinates of the key points of the desired approach path and also the target or pathway are readily determinable from the pixel or voxel which the operator has specified with the pointing device. The coordinates can easily be converted into a series of instructions which can be passed to the control arrangement of the robot so that the robot effects the appropriate moves to cause the end effector carried by the robot to follow the desired approach path to the target or pathway.

The robot may be positioned above or adjacent the real work piece, but before it can carry out the instructions provided to the robot controller, a registration process must be performed to bring the frames of reference of the robot, the work piece and the computer representation into alignment. In other words, the robot must initially be positioned in such a way that when the robot carries out the instructions, which have been passed to the robot control arrangement, the end effector which is moved by the robot follows the appropriate path relative to the work piece.

It has been proposed (see EP-A-0,755,660) to bring the frames of reference of a robot, a work piece, a computer control arrangement into alignment by utilizing markers which are visible, both to the eye and to the imaging technique which is utilized the markers being fixed temporarily to the work piece before imaging is effected. To effect registration between the robot and the work piece, the computer mouse is used to indicate a first marker on the computer-displayed image, and the robot is then moved so that the appropriate part of the end effector carried by the robot touches the corresponding marker on the real work piece. Thus, effectively, the end effector of the work piece is moved to a predetermined position, which is a known position in the computer generated image. This process is repeated with the other markers. A rotation and translation can then be specified which brings the coordinate frame used by the robot into registration with the coordinate frame of the work piece as displayed in the computer generated image. At least three markers are required, but in practice better results are obtained by using between five and ten markers, and also by taking two or three readings at each marker. A "least squares" approach may then be used to manipulate the data to obtain a best fit.

This technique is effective, but is tedious for the operator, and prone to inaccuracy due to errors in positioning either the robot or the mouse.

Thus, one aspect of the present invention seeks to provide a method for registering a work piece to a computer model which does not possess the disadvantages of the prior art.

In some types of robot tasks, the robot is required to handle more than one tool, or may handle a tool that may possibly have been deformed in shape, or which may have a variable length. For example, the tool part of the tool may be worn away. In many situations accurate positioning of the tip of the tool is required and consequently, it is necessary to register or "calibrate" the robot so that the position of the tip of the tool, relative to some fixed point on the robot, is known precisely. This will enable the robot to position the tip of the tool in the required position, regardless of the identity of the tool that is being used, or regardless of any deformation that may have occurred to the tool. Thus, in another aspect, the present invention provides a method for achieving such a registration or "calibration" without the need to touch the tip of the tool. This is important in applications where the tip of the tool may easily be damaged or where it is essential that the tip of the tool be maintained in a sterile condition.

BRIEF SUMMARY OF THE INVENTION

According to this invention there is provided a method of registering a robot relative to a work piece which has a plurality of visible markers, wherein the robot carries a visual image acquiring arrangement, said method comprising the initial step of acquiring images of the work piece and markers, and storing the images, and preparing commands for the robot in terms of the coordinates of the stored images, and comprising the subsequent steps of determining data by placing the operative parts of the robot in a first condition with the visual image acquiring arrangement directed towards the work piece, acquiring and storing an image of the work piece and markers and subsequently moving the component parts of the robot so that the image acquiring arrangements acquires a second, different image of the work piece and markers, and repeating the process to acquire data comprising a plurality of images and, for each image, data concerning the position of the component parts of the robot when the image was acquired, said data being stored. The method further comprises the step of comparing the initially acquired images of the work piece with the images acquired by the visual image acquiring arrangement in the said subsequent steps, and effecting registration of the robot to enable the robot to perform one or more operations with reference to the work piece on the basis of the commands prepared for the robot in terms of the coordinates of the stored images acquired in said image or step.

Advantageously there are four or more visible markers provided on the work piece.

In one embodiment the method may include subsequent steps for the calibration of a tool held by the robot. The method comprises the steps of using the image acquiring apparatus to acquire successive images of a tool carried by part of the robot, when that part of the robot is in different positions, and subsequently determining the precise relative position of the tip of the tool, relative to the part of the robot.

The invention also relates to an apparatus for registration of a robot relative to a work piece. The apparatus comprises visual image acquiring means, and means to mount the visual image acquiring means on part of a robot, means to store an image acquired by the visual image acquiring means, and means to store a subsequent image acquired by the visual image acquiring means. The apparatus further comprises means for determining and storing data concerning the position of at least one component part of the robot when each image was acquired, and wherein the apparatus further comprises means to store a plurality of previously acquired images of the work piece, and means for comparing the images acquired by the visual image acquiring means with the previously acquired images, and means to generate control signals adapted to control movement of the robot to effect registration of the robot relative to the work piece.

Conveniently the image acquiring means is mounted on a robot and is located to acquire an image of a tool carried by part of the robot when that part of the robot is in different positions.

BRIEF DESCRIPTION OF THE SEVERAL VIEWS OF THE DRAWINGS

In order that the invention may be more readily understood, and so that further features thereof may be appreciated, the invention will now be described, by way of example, with reference to the accompanying drawings in which FIG. 1 is a diagrammatic view illustrating the acquisition of an image of a work piece, and the subsequent processing of the image;

FIG. 2 is a diagrammatic view illustrating a robot and the work piece;

FIG. 3 is a block diagram illustrating the control arrangement for the robot of FIG. 3;

DETAILED DESCRIPTION OF THE INVENTION

Figure 4:
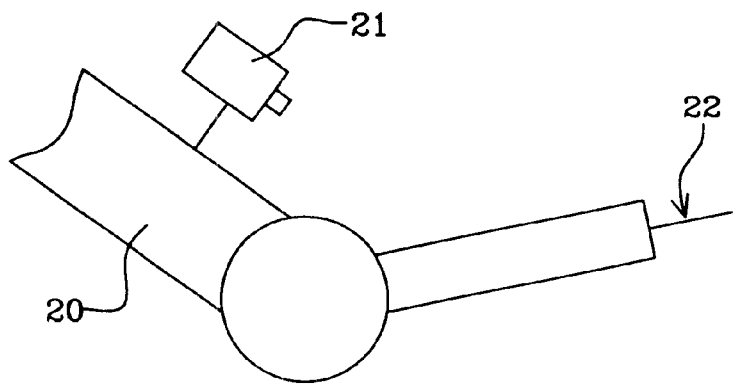
FIG. 4 is a schematic view illustrating a part of a robot carrying an end effector in the form of a tool.

Referring initially to FIG. 1 of the accompanying drawings a work piece, which may comprise an inanimate object, or which may comprise an animate form 1 that is, for example, to undergo surgery, is provided with a plurality of visible markers 2. It is preferred at least three markers are provided, but preferably a greater number of markers is present. If only three markers are provided, or if a greater number of markers are provided, the markers should not be located at positions equivalent to the corners of a regular geometric figure, such as a equilateral triangle or a square, but instead should be irregularly positioned.

As shown in FIG. 1, an image acquiring arrangement 3 is utilized to acquire an appropriate image of the work piece and the markers. The markers are selected to be "visible" to the image acquiring arrangement 3. The image acquiring arrangement 3 may take any convenient form, and may thus comprise an x-ray arrangement, an ultra-sonic scanning arrangement, a magnetic resonance imaging arrangement or other equivalent arrangement capable of acquiring an appropriate image. The image is processed 4 and stored 5. The stored image may be utilized by an operator to prepare commands which are subsequently to be followed by a robot. The commands may specify a path to be followed by a tool carried by the computer, relative to the work piece, or may specify an internal target to be operated on by the robot, for example, if the robot is to control the firing of a particle beam or a narrow beam of radiation to a particular site within the work piece.

The commands 6 and the stored image are retained in an appropriate format.

FIG. 2 illustrates diagrammatically a robot 7 which is located adjacent the work piece 1 having the markers 2 in position.

The robot 7 comprises a housing 8 carrying a support column 9, to which is pivotally connected a support arm 10 which carries an end effector carrying arm 11. The end effector carrying arm 11 carries, at its free end, a tool or other end effector 12. The various arms are inter-connected by pivotal connections.

Mounted on the end effector carrying arm 11 is a camera or visual image acquiring apparatus 13 in the form of a television camera, a digital camera, CCD device or the like. The camera 13 is adapted to acquire a visual image of the work piece 1 and the markers 2.

Referring now to FIG. 3, the camera 13 acquires an image of the work piece, together with the visible markers, and the image is digitized and fed to a store 14. The store 14 also stores data relating to the position of the components of the robot. All of the various movable parts of the robot are moved under the control of a sophisticated control arrangement, and consequently data can readily be generated, 15, indicating the precise position of all the component parts of the robot.

Once a first image has been stored, the robot is moved, and a second image is taken. This process is repeated several times.

The stored images in the store 14 are compared, in a comparator 16, with the stored images from the store 5 shown in FIG. 1. On comparing the stored images, a registration procedure 17 is carried out in which the position of the camera 13 carried by the robot is determined with regard to the frame of reference identified by the stored images of the work piece.

Consequently, the control arrangement 18 of the robot can determine, with regard to the coordinate frame of reference of the robot, the precise position and orientation of the work piece relative to the robot, thus enabling the robot to follow accurately commands 19 which were derived with reference to the original images of the work piece.

It is thus to be appreciated that the robot may effect precisely predetermined operations on the work piece without any time consuming pre-registration relative to the work piece, using an automated arrangement which minimizes the risk of errors arising.

Figure 5:
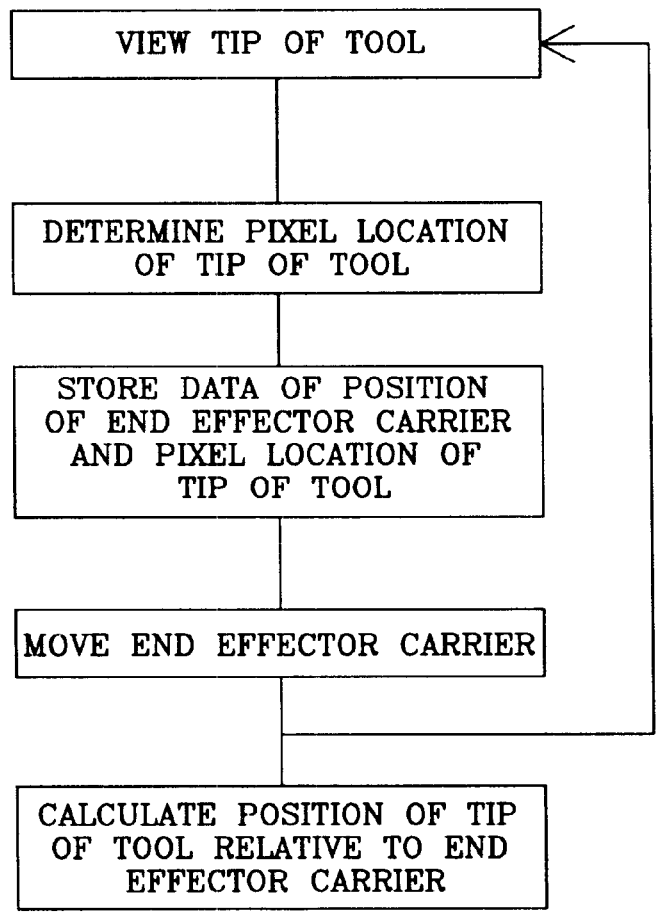
FIG. 5 is a block diagram.

Referring now to FIGS. 4 and 5 of the accompanying drawings, FIG. 4 illustrates schematically an end effector carrying arm 20 of a robot on which is mounted a camera image acquiring device 21, such as a television camera, digital camera or CCD device. The camera 21 is so located that, within the view of the camera, there is a tool 22 which is carried by the end effector carrying arm 20.

It is desirable for the control arrangement within the robot to have data indicating the precise position of the tip of the tool 22 with regard to the end effector arm 20, or some other part of the robot. In order to acquire this data, the tip of the tool 22 is viewed with the camera 21. The location of the pixel of the tip of the tool is effected using an appropriate thresholding technique and computer analysis of the measured image. It is to be appreciated that when viewing the tip of the tool, it may be appropriate for a "background " of a contrasting brightness or color to be located immediately behind the tool as viewed by the camera. This will facilitate the thresholding method utilized by the computer to identify the pixel in which the tip is located.

Data is stored relating to the position of the end effector carrier and the pixel location of the tip of the tool.

Subsequently, the end effector carrier is moved, and the process of viewing the tip of the tool, determining the pixel location of the tip of the tool, and the storing of data relating to the position of the end effector carrier, and the pixel location of the tip of the tool is repeated. This process may be repeated many times, until sufficient data has been accumulated for an accurate calculation to be performed to determine the position of the tip of the tool relative to the end effector carrier. Theoretically, it is possible to perform the calculation when three sets of data have been taken. However, greater accuracy can be achieved if a greater number of sets of data are taken and stored.

I claim:

1. A method of registering a robot relative to a work piece which has a plurality of visible markers, wherein the robot carries a visual image acquiring arrangement, said method comprising the initial step of acquiring images of the work piece and markers, and storing the images, and preparing commands for the robot in terms of the coordinates of the stored images, and further comprising the subsequent steps of determining data by placing operative parts of the robot in a first condition with the visual image acquiring arrangement directed towards the work piece, acquiring and storing an image of the work piece and markers and subsequently moving component parts of the robot so that the image acquiring arrangement acquires a second, different image of the work piece and markers, and repeating said steps to acquire data comprising a plurality of images and, for each image, data concerning the position of the component parts of the robot when the image was acquired, said data being stored, the method further comprising the step of comparing the initially acquired images of the work piece with the images acquired by the visual image acquiring arrangement in the said subsequent steps, and affecting registration of the robot to enable the robot to perform one or more operations with reference to the work piece on the basis of the said commands prepared for the robot in terms of the coordinates of the stored images acquired in said image or step.

2. A method according to claim 1 wherein there are four or more visible markers provided on the work piece.

3. A method according to claim 1 futher comprising subsequent steps for the calibration of a tool held by a robot, the subsequent steps comprising the steps of using the image acquiring apparatus to acquire successive images of a tool carried by part of the robot, when that part of the robot is in different positions, and subsequently determining the precise relative position of the tip of the tool, relative to said part of the robot.

4. An apparatus for registration of a robot relative to a work piece comprising visual image acquiring means, and means to mount the visual image acquiring means on part of a robot, means to store an image acquired by the visual image acquiring means, and means to store a subsequent image acquired by the visual image acquiring means, said apparatus further comprising means for determining and storing data concerning the position of at least one component part of the robot when each image was acquired, and wherein the apparatus further comprises means to store a plurality of previously acquired images of the work piece, and means for comparing the images acquired by the visual image acquiring means with the previously acquired images, and means to generate control signals adapted to control movement of the robot to effect registration of the robot relative to the work piece.

5. An apparatus according to claim 4 wherein the image acquiring means is mounted on a robot and is located to acquire an image of a tool carried by part of the robot when that part of the robot is in different positions.

* * * * *